(12) United States Patent
Chang et al.

(10) Patent No.: US 7,716,503 B2
(45) Date of Patent: May 11, 2010

(54) EXTENSION CARD INCORPORATING POWER MANAGEMENT DEVICE

(75) Inventors: Lin-Wei Chang, Taipei (TW); Yi-Chun Shih, Taipei (TW)

(73) Assignee: Inventec Corporation, Taipei (TW)

(*) Notice: Subject to any disclaimer, the term of this patent is extended or adjusted under 35 U.S.C. 154(b) by 685 days.

(21) Appl. No.: 11/639,912

(22) Filed: Dec. 14, 2006

(65) Prior Publication Data

US 2008/0148074 A1  Jun. 19, 2008

(51) Int. Cl.
*G06F 1/00* (2006.01)
(52) U.S. Cl. .............. 713/300; 312/223.1; 312/223.2
(58) Field of Classification Search ................ 713/300; 312/223.1, 223.2
See application file for complete search history.

(56) References Cited

U.S. PATENT DOCUMENTS

| | | | | |
|---|---|---|---|---|
| 5,912,621 | A * | 6/1999 | Schmidt ..................... | 340/571 |
| 6,026,454 | A * | 2/2000 | Hauck et al. ................. | 710/65 |
| 6,148,418 | A * | 11/2000 | Wang et al. .................. | 714/25 |
| 6,795,926 | B1 * | 9/2004 | Matula et al. ............... | 713/300 |
| 7,516,263 | B2 * | 4/2009 | Sandy et al. ................ | 710/316 |
| 2002/0044416 | A1 * | 4/2002 | Harmon et al. ............. | 361/685 |
| 2005/0102454 | A1 * | 5/2005 | McAfee et al. .............. | 710/107 |
| 2007/0186088 | A1 * | 8/2007 | Khatri et al. ................. | 713/1 |
| 2007/0239925 | A1 * | 10/2007 | Koishi ......................... | 710/316 |
| 2007/0276981 | A1 * | 11/2007 | Atherton et al. ............. | 710/307 |

FOREIGN PATENT DOCUMENTS

| | | | |
|---|---|---|---|
| JP | 05035602 A | * | 2/1993 |
| JP | 09146846 A | * | 6/1997 |
| JP | 2000224277 A | * | 8/2000 |
| JP | 2001060774 A | * | 3/2001 |
| WO | WO 9534065 A2 | * | 12/1995 |

* cited by examiner

*Primary Examiner*—Mark Connolly
(74) *Attorney, Agent, or Firm*—Peter F. Corless; Steven M. Jensen; Edwards Angell Palmer & Dodge LLP

(57) ABSTRACT

The present invention provides an extension card incorporating a power management device applicable to electronic devices. During the operating process, if the removal of the top cover from the housing of the electronic device is detected, power supply to the electronic device is immediately cut off. The extension card incorporating the power management device is characterized in that a plurality of signal pins are disposed on a side of the power management device and electrically connected to a plurality of idle pins of the extension card, the idle pins conveying no signals processed by the extension card but transmitting a power-off signal to the motherboard when electrically connected to the connecting port of the motherboard.

5 Claims, 4 Drawing Sheets

EXTENSION CARD INCORPORATING POWER MANAGEMENT DEVICE

BACKGROUND OF THE INVENTION

1. Field of the Invention

The present invention relates to electronic extension cards, and, more particularly, to an electronic extension card incorporating a power management device which is installed on a side thereof to protect circuits during the blackout.

2. Description of the Related Art

The rapid development of electronic technology has accelerated the growth of various types of commercial electronic products with multifunction. In general, commercial electronic products may utilize a small memory card for data storage, and other types of small electronic cards for peripheral functions. As such, the configuration of electronic products becomes more and more complicated along with an increasing number of necessary components, resulting in power control wires intertwining with the surrounding distributing wires and causing difficulty to configure the systems.

For example, a removable top cover is often utilized in the housing of the present desktop computers that comprises a motherboard, an interfacing card on the motherboard, a memory unit, a CPU, a fan and distributing wires connecting the motherboard to each of the peripheral devices. And naturally, the more functions a system includes, the more number of interfacing card slots and distributing wires connected to its peripheral devices are required, thus leading to a dilemma of intertwisting wiring and insufficient slots within the limited space.

FIG. 1 is a perspective view showing a power management device applied to an electronic device according to the prior art. The power management device comprises a detecting spring 11, a detecting body 12, a power control wire 13, and an adapter 14. The detecting spring 11 is used to detect the pressure when a top cover of a housing of the electronic device is closed, the detecting spring 11 receives the pressure of the top cover and is depressed to become nearly flush with the detecting body 12, such that the detecting spring 11 is pressed to deform and contact the circuits (not shown) and thus generate signals, which are then transmitted through power control wire 13 to the motherboard connected by the adapter 14.

Further, there is provided a housing cover 19 on the top of the housing, and one side of the housing 18' has a fixing rack 15 for installing the power management device, the adapter 14 of the power control wire 13 of the power management device can be inserted into the face board connecting pins 16 to electrically connect with the motherboard 17. When the housing cover board 19 is tightly covered on the housing 18, as described above, the detecting spring 11 receives the pressure from the top cover and is pressed down to be parallel with the detecting body 12. Concurrently, the power management device transmits a signal via the adapter 14 connected with the power control wire 13 from the circuits of the motherboard 17 to a power supplier (not shown) to maintain the power-on status. When the housing cover 19 is ejected and removed from the housing 18, as indicated by the arrow, the detecting spring 11 restores to its original protrusive shape, and at this time, the power management device transmits a signal via the adapter 14 connected with the power control wire 13 from the circuits of the motherboard 17 to a power supplier (not shown) to cut the power off.

The prior art technique of opening the housing on one hand can detect the detachment of the top cover, but on the other hand necessitates adding a power management device that electrically connect with its power control wire and the motherboard, increasing complexity of an internal system by having more power wires intertwining with one another that in turn increases difficulty in installation, and thus the assembling components and costs as a result. The conventional technique fails to meet the trend of simplicity for easy installation and maintenance in computer systems.

Therefore, it is desirable to provide an extension card incorporating a power management device within the limited space of an electronic device to mitigate and/or obviate the aforementioned problems.

SUMMARY OF THE INVENTION

A primary objective of the present invention is to provide an extension card incorporating a power management device, which effectively protects the circuits by accommodating a protection device within its limited space.

Another objective of the present invention is to provide an extension card incorporating a power management device, which prevents the power control wire of the protection device from intertwining with the surrounding distributing wires.

Another objective of the present invention is to provide an extension card incorporating a power management device, which can be installed with ease and reduce the costs as a result.

To achieve the objectives, an extension card incorporating a power management device applicable to electronic devices is provided, which comprises at least a housing body, a top cover for covering the housing body, a motherboard accommodated in the housing body and a power supplier electrically connecting with the motherboard for providing electric power to the electronic device, wherein the motherboard has a connecting port for the insertion of the extension card. When the power management device of the extension card detects the removal of the top cover from the housing, it transmits a power-off signal to the motherboard to cut off the supply of power to the electronic device. The extension card incorporating the power management device is characterized in that a plurality of signal pins are disposed on a side of the power management device and electrically connected to a plurality of idle pins of the extension card, the idle pins conveying no signals processed by the extension card but transmitting the power-off signal to the motherboard when electrically connected to the connecting port of the motherboard.

Other objects, advantages, and novel features of the invention will become more apparent from the following detailed description when taken in conjunction with the accompanying drawings.

DETAILED DESCRIPTION OF THE PREFERRED EMBODIMENT

The present invention is described in the following so that one skilled in the pertinent art can easily understand other advantages and effects of the present invention. The present invention may also be implemented and applied according to other embodiments, and the details may be modified based on different views and applications without departing from the spirit of the invention.

Figure 1:
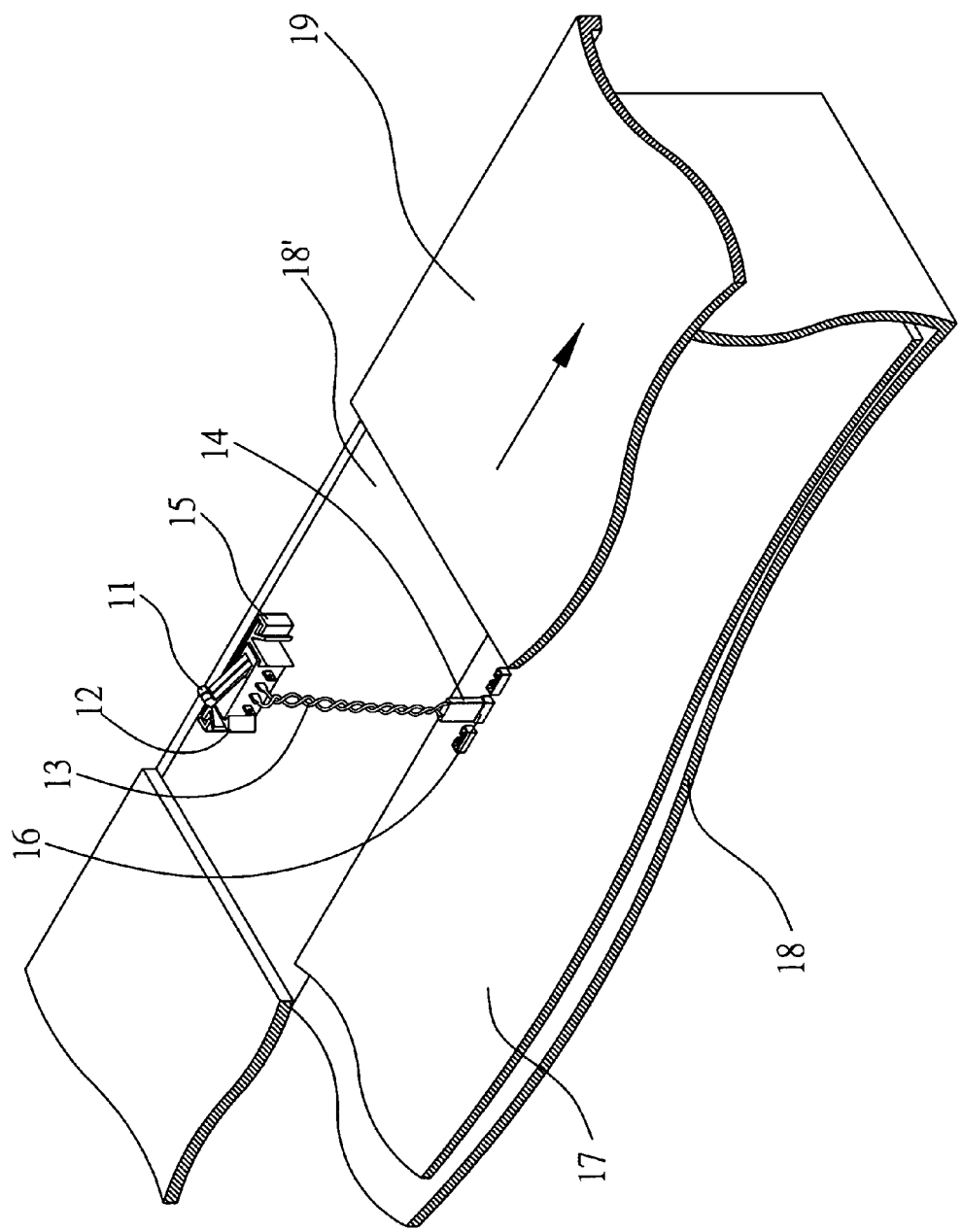
FIG. 1 is a perspective view of applying a prior power management device to an electronic device.
Figure 2A:
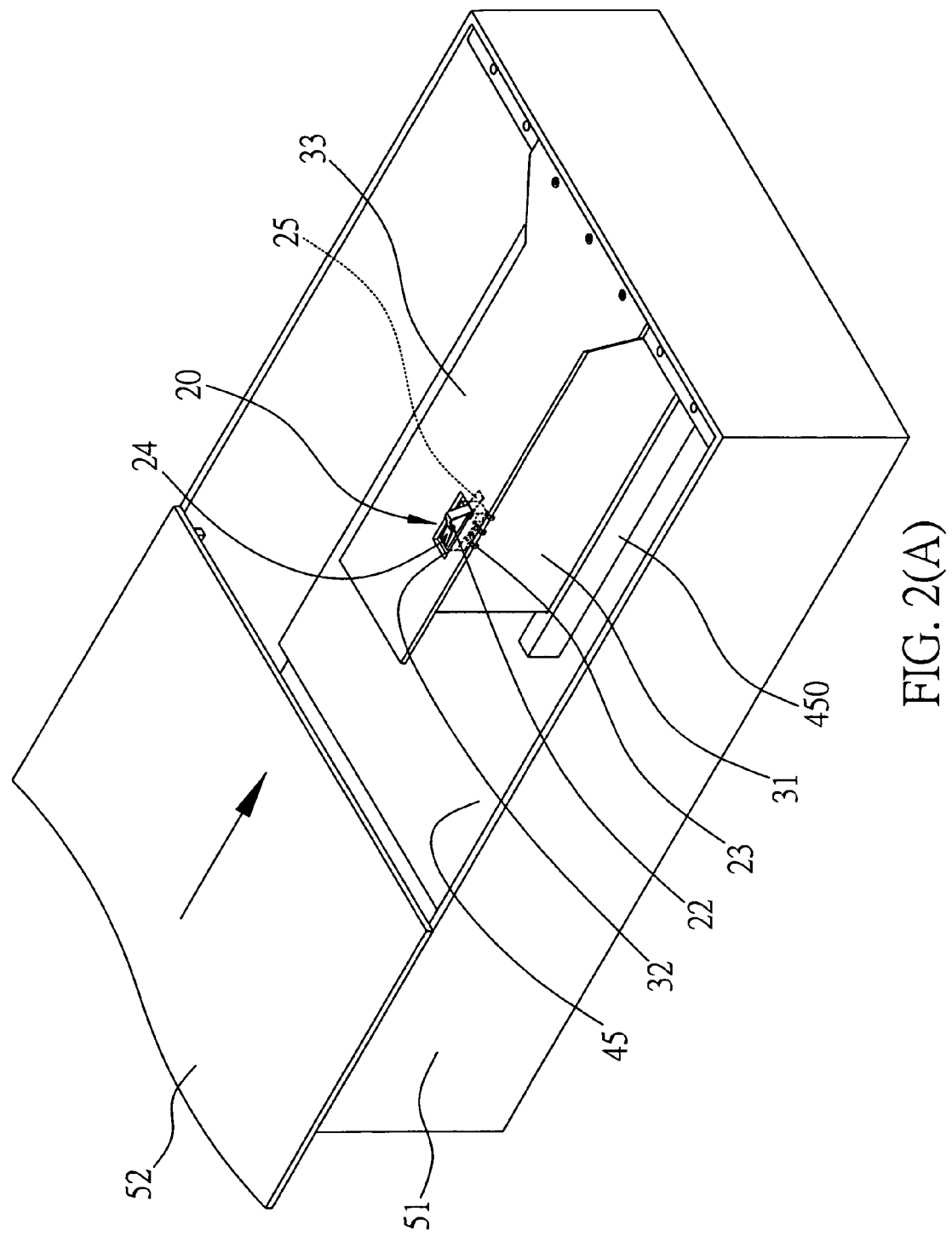
FIGS. 2(A) and 2(B) are perspective views of applying the extension card incorporating a power management device to an electronic device according to the present invention.
Figure 2B:
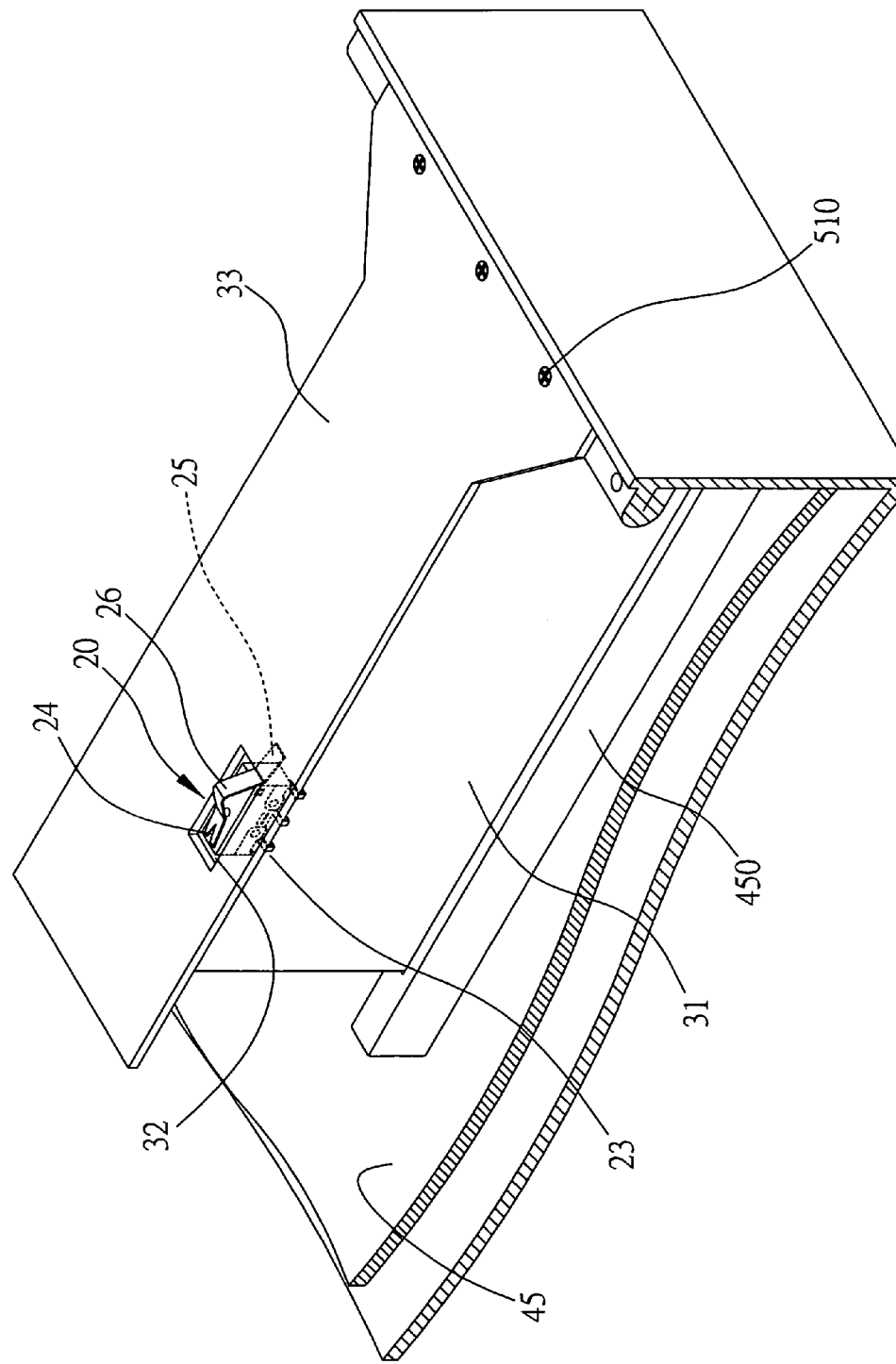

FIGS. 2(A) and 2(B) are perspective views of an extension card 31 incorporating a power management device 20 in accordance with the present invention. The extension card 31 incorporating the power management device 20 of the present invention is applied to an electronic device, which comprises at least a housing body 51, a top cover 52 for covering the housing body 51, a motherboard 45 accommodated in the housing body 51, and a power supplier (not shown) electrically connecting with the motherboard 45 for supplying electric power to the electronic device. The extension card 31 is inserted into the motherboard 45 via a connecting port on the motherboard 45. The power management device 20 is adapted to detect the removal of the top cover from the housing, and then transmit a power-off signal to the motherboard 45 to cut off supply of power to the electronic device. Note that the power management device 20 is a known art and for brevity and clarity, the description thereof will not be further detailed but only the part related to the present invention is described herein.

An assisting fixing device 33 is disposed on the top of the extension card 31, one end of the assisting fixing device 33 being fixedly posited on the housing body 51 by coupling members such as screws 510, thereby securing the extension card 31 on the connecting port 450 of the motherboard 45 and preventing the extension card 31 from coming off due to the movement of the electronic device.

Figure 3:
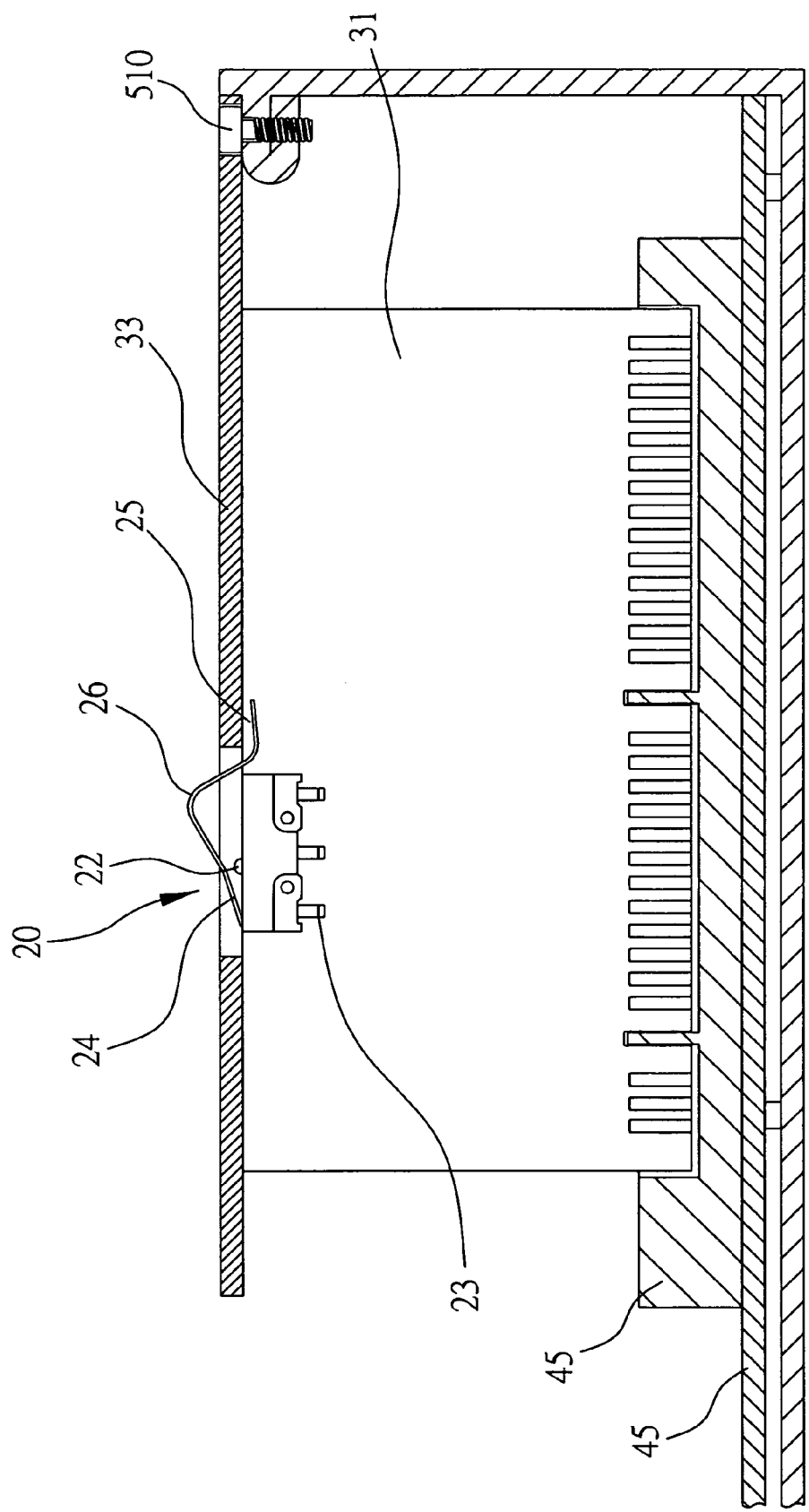
FIG. 3 is a side view of the extension card incorporating a power management device according to the present invention.

Please refer to FIG. 3, which is a side view of the extension card 31 incorporating the power management device 20 according to the present invention. The power management device 20 comprises a detecting element 22, a plurality of signal pins 23, and an actuating portion 26. The signal pins 23 are disposed on one side of the power management device 20 and can be configured on the extension card 31 by welding through the signal pins 23. The extension card 31 comprises various types of interfacing cards such as a Peripheral Component Interconnect card (PCI), an Accelerated Graphic Port card (AGP), a PCI Express card and a raiser card. The extension card connecting pins 31 (such as golden fingers) that are inserted into the connecting port 450 are idle pins not being processed by the extension card 31 and electrically connect with the signal pins 23 disposed on one side of the power management device 20.

The actuating portion 26 of the power management device 20 has a fixing end 24 connected with the power management device 20 and a free end 25 bending and extending upward from the fixing end 24. In this embodiment, the actuating portion 26 is made of an elastic material, such as a metallic or plastic material. The assisting fixing device 33 is formed with an opening 32 for allowing part of the upward extending and bending portion of the actuating portion 26 to protrude from the opening 32 of the assisting fixing device 33.

The detecting element 22 of the power management device 20 is posited under the actuating portion 26 and close to the fixing end 24 of the actuating portion 26. The detecting element 22 is an elastic button and the electrical signal wire (i.e. power control wire and is not shown) of the detecting element 22 is electrically connected with the signal pins 24, so as to transmit results of detection (removal of the top cover from the housing) via the signal pins 23 to the extension card 31, and further transmit signals detected by the detecting element 22 via the extension card 31 connecting pins connected with the signal pins 23 to the motherboard. In this embodiment, signals detected by the detecting element 22 allow the motherboard 45 to control the power supply of the electronic device accordingly based on the detected pressure to determine if the power supply to the electronic device should be cut off.

During the operating process of the electronic device, when the power management device 20 is covered by the top cover 52 and thus the actuating portion 26 is pressed to change the position of the free end 25 thereof and touch the detecting element 22, the motherboard 45 continues to supply power to the electronic device. Conversely, when the power management device 20 is not covered by the top cover 52 and thus the actuating portion 26 is released to protrude from the opening 32 of the assisting fixing device 33, the detecting element 22 free from the actuating portion 26 generates a power-off signal and further transmits a power-off signal to the extension card 31 via the signal pins 23 of the power management device 20, and the extension card 31, via the connecting pins electrically connecting with the motherboard 45, transmits the power-off signal to the motherboard 45 to cut off supply of power to the electronic device accordingly. In other words, if the top cover 52 is removed from the housing body 52 during an operating process of the electronic device, that is, the top cover 52 is not covered on the power management device 20 and thus the actuating portion 26 is not pressed, the free end 25 of the actuating portion 26 will protrude and not contact the detecting element 22, allowing the motherboard 45 to cut off supply of power to the electronic device to cease the operation of the electronic device.

In summary, the extension card incorporating the power management device according to the invention features incorporating the power management device with the extension card to improve on the prior art problems as discussed above. The power management device is designed to protrude from the opening of the assisting fixing device or on one side of the extension card without affecting the wiring configuration of the electronic device, thereby allowing the motherboard 45 to automatically cut off supply of power to the electronic device to cease the operation of the electronic device once the power management device detects the removal of the top cover from the housing body. Therefore, the present invention is not only capable of effectively accommodating a known power management device within the limited space of the housing, but it also facilitates installation of the power control wire for the power management device to prevent the power control wire from intertwining with the surrounding distributing wires. Accordingly, the present invention offers advantages over the prior art techniques and has high applicability.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An extension card incorporating a power management device, which is applicable to an electronic device comprising a housing body, a top cover for covering the housing body, a motherboard accommodated in the housing body, an assisting fixing device, and a power supplier electrically connected with the motherboard for supplying electric power to the electronic device, in which the motherboard has a connecting port for insertion of the extension card, and the power management device of the extension card, upon detection of a removal of the top cover from the housing, transmits a power-off signal to the motherboard to disable the power supply to further supply the electric power to the electronic device, the extension card incorporating the power management device being characterized in that:

the assisting fixing device is disposed on top of the extension card and one end of the assisting fixing device is fixedly posited on the housing body by coupling members, thereby securing the extension card on the connecting port of the motherboard, and a plurality of signal pins are disposed on a side of the power management device and electrically connected to a plurality of idle pins of the extension card, the idle pins conveying no signals processed by the extension card but transmitting the power-off signal to the motherboard when electrically connected to the connecting port of the motherboard.

2. The extension card incorporating a power management device of claim 1, wherein the power management device is disposed on one side of the extension card.

3. The extension card incorporating a power management device of claim 1, wherein the coupling members are screws.

4. The extension card incorporating a power management device of claim 1, wherein the power management device comprises an actuating portion comprising a fixing end connected with the power management device and a free end bending and extending upward from the fixing end, and an assisting fixing device formed with an opening for allowing part of the upward extending and bending portion of the actuating portion to protrude from the opening, thereby detecting if the top cover has been removed from the housing.

5. The extension card incorporating a power management device of claim 1, wherein the extension card may be a Peripheral Component Interconnect card (PCI), an Accelerated Graphic Port card (AGP), a PCI Express card and a raiser card.

* * * * *